United States Patent [19]

Coburn et al.

[11] 4,264,912
[45] Apr. 28, 1981

[54] IMAGE FORMATION AND DEVELOPMENT APPARATUS

[75] Inventors: Richard J. Coburn, West Hartford; Thomas D. Kegelman, Ridgefield, both of Conn.

[73] Assignee: KCR, Inc., East Hartford, Conn.

[21] Appl. No.: 34,728

[22] Filed: Apr. 30, 1979

[51] Int. Cl.³ .................... G03G 15/00; H04N 1/04; H04N 5/80

[52] U.S. Cl. ................... 346/161; 346/74.2; 358/300; 355/20

[58] Field of Search ............ 346/160, 161, 158–159, 346/74.1, 110 R, 110 V; 358/300; 355/3 R, 20, 15; 360/128, 137

[56] References Cited

U.S. PATENT DOCUMENTS

| 3,136,917 | 6/1964 | Stone, Jr. | 315/12 R |
| 3,681,527 | 8/1972 | Nishiyama et al. | 346/160 X |
| 3,681,777 | 8/1972 | Smura | 346/161 |
| 4,134,668 | 1/1979 | Coburn | 358/300 X |

Primary Examiner—John H. Wolff
Attorney, Agent, or Firm—Hayes & Reinsmith

[57] ABSTRACT

Image formation and development apparatus using electrostatic techniques which is suitable for plain paper printing is provided wherein a cathode ray pin tube is used with a flexible discontinuous dielectric member that is moved past the pin tube, the selectively energized pins providing information-bearing areas (i.e. toner attracting areas) on the dielectric member; the latent electrostatic image is developed and may thereafter to transferred to plain paper and fixed for subsequent use. The apparatus includes pin tube cleaning means operative when the belt discontinuity passes the pin tube face.

6 Claims, 5 Drawing Figures

IMAGE FORMATION AND DEVELOPMENT APPARATUS

BACKGROUND OF THE INVENTION

Plain paper printing apparatus utilizing cathode ray tube devices to form latent electrostatic images on a photoreceptor are known in the art as shown by U.S. Pat. No. 4,134,668 issued on Jan. 16, 1979 in the name of Richard J. Coburn, inventor, a co-inventor of the system described herein. In such a system, the cathode ray tube was used to provide an optical image to effect formation on a traditional photoreceptor of the xerography type, the latent image thereafter being developed and transferred to plain paper and fixed in accordance with the techniques set forth in said patent.

Moreover, it is known in the art to use pin tubes, often referred to as CRT pin tubes, or conductive faceplate cathode ray tubes, sometimes referred to as Braun-tubes or the like which are primarily characterized by the fact that an array of electrodes extend through the face of the cathode ray tube, the electron beam of the cathode ray tube being controlled to selectively impinge upon the pins protruding through the face plate to effect changes in the electric potential of those pins. In U.S. Pat. No. 3,681,527, issued to Messrs. Nishiyama and Tanaka, the use of such a pin tube in connection with a photosensitive belt or the like is disclosed and claimed as a facsimile reading and recording device. The Nishiyama et al patent also discloses an arrangement whereby a reflective beam within the pin tube is varied depending upon the amount of electric charge presented by a belt, the change in electric signal being sensed and collected to be used with a distant facsimile receiver.

A still further work in the electrostatic printing art is found in a publication entitled "High Speed Non-Impact Printer Using Dielectric Drum", attributed to Masakatsu Horie and Hideo Takahashi of Fujitsu Laboratories Limited wherein there is disclosed a drum-type electrostatic printing system. In this Fujitsu system, the drum is provided with a positive polarity precharge, the drum cooperating with an array of pins which are used to selectively discharge portions of the drum to form a latent image, which latent image is thereafter developed and printed. The Fujitsu article discloses a plurality of suitable dielectrics, the principal feature being a plurality of discrete pins placed a small distance from the electrostatic drum, the information being supplied by suitable switching circuits to the pins forming a part of the recording head.

Finally, it is known in the art to use so-called liquid developers of the type shown in U.S. Pat. Nos. 3,892,481 and 3,892,418 as well as U.S. Pat. No. 4,035,071, all of which show systems utilizing liquid developers or toners containing the desired charged particles which are used in connection with the electrostatic charge distribution on a drum to form a latent image which is thereafter transferred and fixed.

It is therefore well-known in the prior art to use electrostatic imaging, liquid toners, and the broad concept of selective discharge of a precharged electrostatic drum to effect formation of latent image charges which can thereafter be developed with liquid toners, transferred and converted into printed intelligence.

SUMMARY OF THE INVENTION

A principal object of the present invention is to provide image forming apparatus utilizing a cathode ray pin tube in cooperation with a precharged electrostatic member on which the desired information can be formed as an electrostatic image which is thereafter developed.

It is a further object of this invention to provide improved image forming apparatus wherein an electrostatic member is formed in the shape of a belt which belt is electrostatically precharged and thereafter is brought into virtual contact with the pin array of a cathode ray pin tube to accomplish high speed, reliable electrostatic image formation.

It is a still further object of this invention to provide improved plain paper printing apparatus wherein the electrostatic member is provided with a uniform electrically positive charge before it is brought into virtual contact with a cathode ray pin tube, the cathode ray pin tube being controlled so as to energize only those pins in the region of the electrostatic medium on which no information is to be presented, thereby to provide on the remaining portion of the uniformly precharged member the desired latent electrostatic image which can be thereafter developed and printed.

It is an additional object of this invention to provide electrostatic apparatus of the type described wherein the pin array of the cathode ray pin tube is periodically cleaned without interrupting the normal operation of the apparatus.

It is also an object of this invention to provide improved image formation and printing apparatus using a discontinuous belt as the electrostatic charge receiving member, which belt is driven and supported to cooperate with a cathode ray pin tube which tube is controlled to form an electrostatic image on the belt by selectively dissipating a precharge on the belt.

Other objects will be in part obvious and in part pointed out in more detail hereinafter.

A better understanding of the objects, advantages, features, properties and relations of the invention will be obtained from the following detailed description and accompanying drawings which set forth illustrative embodiments which are indicative of the ways in which the principles of the invention are employed.

DESCRIPTION OF A PREFERRED EMBODIMENT

Figure 1:
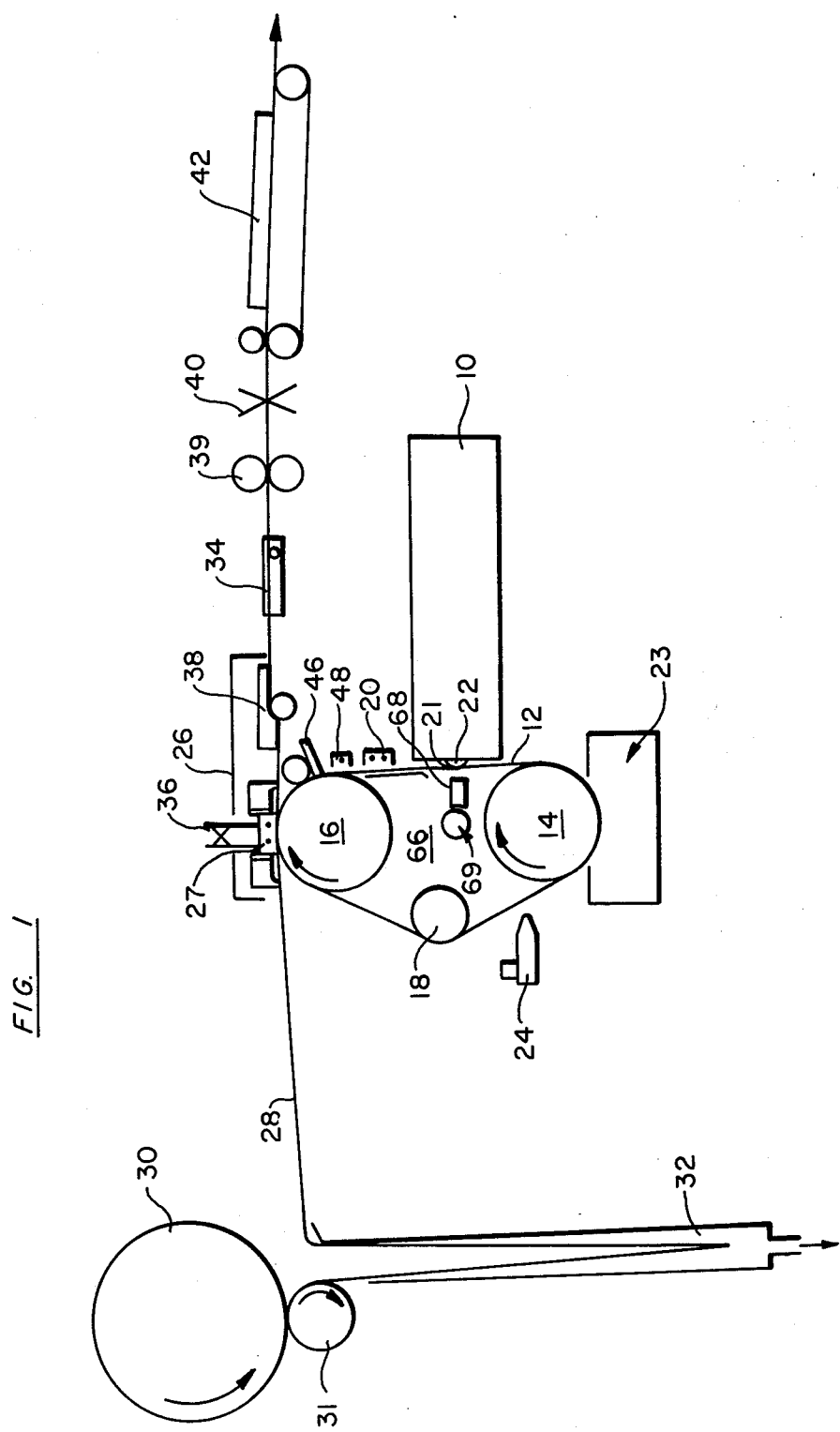
FIG. 1 is a schematic drawing of the system of this invention.

The device known as a cathode ray pin tube shown schematically in FIG. 1, is generally described in the aforementioned U.S. Pat. No. 3,681,527 as a Braun-tube and is a conventional cathode ray tube having a single axis of deflection with a pin or conductive nib array extending across and through the CRT glass face, the number of conductive pins ranging from 250 to 500 per inch across the face of the CRT tube. With proper control and adjustment, such a tube permits selective impingement of the electron beam on the conductive element or pin and it is the utilization of such selective contact with the pins extending through the face of the CRT pin tube that is used in the present system. Turning again to FIG. 1, such a pin tube is shown schematically at 10 and forms a principal portion of the present image development apparatus. The schematic presentation of FIG. 1 shows a dielectric member in the form of belt 12 supported by cylinders 14, 16 and 18, which belt is suitably driven to bring the belt across the face of pin tube 10 in a direction generally perpendicular to the axis of the pin array. The details of that belt arrangement are hereinafter described in greater detail in FIGS. 2 through 4. The belt 12 is formed from a suitable plastic such as Mylar (trademark of E. I. duPont de Nemours) having a metallized or other conductive coating on one side, the belt being susceptible of receiving and retaining a significant electrostatic charge. In the system described, a direct current corona charger 20 is suitably supported near pin tube 10 to produce a high positive electrostatic charge on belt 12 before it comes into virtual contact at 21 with the pin tube nib array 22. As subsequently explained in greater detail, pin tube 10 is controlled and energized to permit the beam of the cathode ray tube to impinge only upon those nibs or conductive elements at a position relative to belt 12 where no information is to be displayed. As used herein, the terms "information" and "information-bearing" refer to those areas of the dielectric member which remain charged to attract toner particles. The nature of the electronic circuitry is such that nib array 22 becomes negative relative to the belt upon impingement by the cathode ray beam so as to neutralize the charge on belt 12 in the desired selected areas. As belt 12 is driven in accordance with the arrows shown on drums 14 and 16, the belt passes through a developer assembly 23 including a liquid toner of the type shown in the noted prior art patents, such toner being a negative attraction toner bath which results in toner particles being attracted to those portions of the belt wherein positive charge remains for the display of information. Such relative polarity between the nib array and the toner particles minimizes attraction of stray toner particles to the nib array.

The belt thereafter passes air knife 24 of conventional construction which air knife "wipes" excess liquid from the belt before the belt progresses to the transfer station 26. At that station a transfer corona 27 is positioned behind a sheet of paper 28 to which, in the preferred embodiment, the toner image appearing on the electrostatic belt is to be transferred. Corona 27, in effect, lifts information, i.e., the toner particles from the face of the dielectric belt onto the underside of paper 28. In the illustrated system, a supply of paper in roll form at 30 is driven in an unwinding direction by feed roll 31 into a vacuum dancer 32, the paper being thereafter supported and driven in synchronism with the dielectric belt by the paper drive tractor 34. Intimate contact for the transfer of toner particles to the paper is maintained by the corona 27 with the paper thereafter proceeding to a drying and fixing station 38 of a conventional manner for subsequent slitting at station 39 and cutting at station 40 with transfer of the cut and slit documents taking place at the conveyor station 42. Vacuum source 36 permits the paper to be displaced from the belt when corona 27 is de-energized with the belt moving for purposes other than printing.

While the foregoing system has been described in connection with a technique employing plain paper to which the toner particles are thereafter fixed, it should be understood that the paper system is only one type of information storage and/or display that can be effectively used with the present invention; for example, direct reading of the toner image as it appears on the dielectric belt can be provided by state of the art techniques, not shown.

Following transfer of the electrostatically formed image to the paper, there is provided a belt cleaning assembly, typically roller and wiper 46 which are intended to remove any remaining liquid and toner particles from the electrostatic belt as it approaches the face of pin tube 10. To further ensure that the belt is properly preconditioned for the receiving of the uniform positive charge from corona 20, there is provided an alternating current cleaning corona 48 which corona provides a uniform dissipation of any residual charge on the belt so as to precondition it for the uniform positive charge by DC corona 20.

The relationship between the electrostatic belt 12 and the pin array 22 of pin tube 10, is a relationship of "virtual contact" such contact being maintained by appropriate positioning of the pin tube so that pin array 22 can, if desired, engage the dielectric belt which because of its flexible nature, can be deflected to maintain the desired contact or atlernatively with appropriate mounting a very small spacing can be maintained, all as may be dictated by the desired electrostatic charge transfer conditions.

Figure 2:
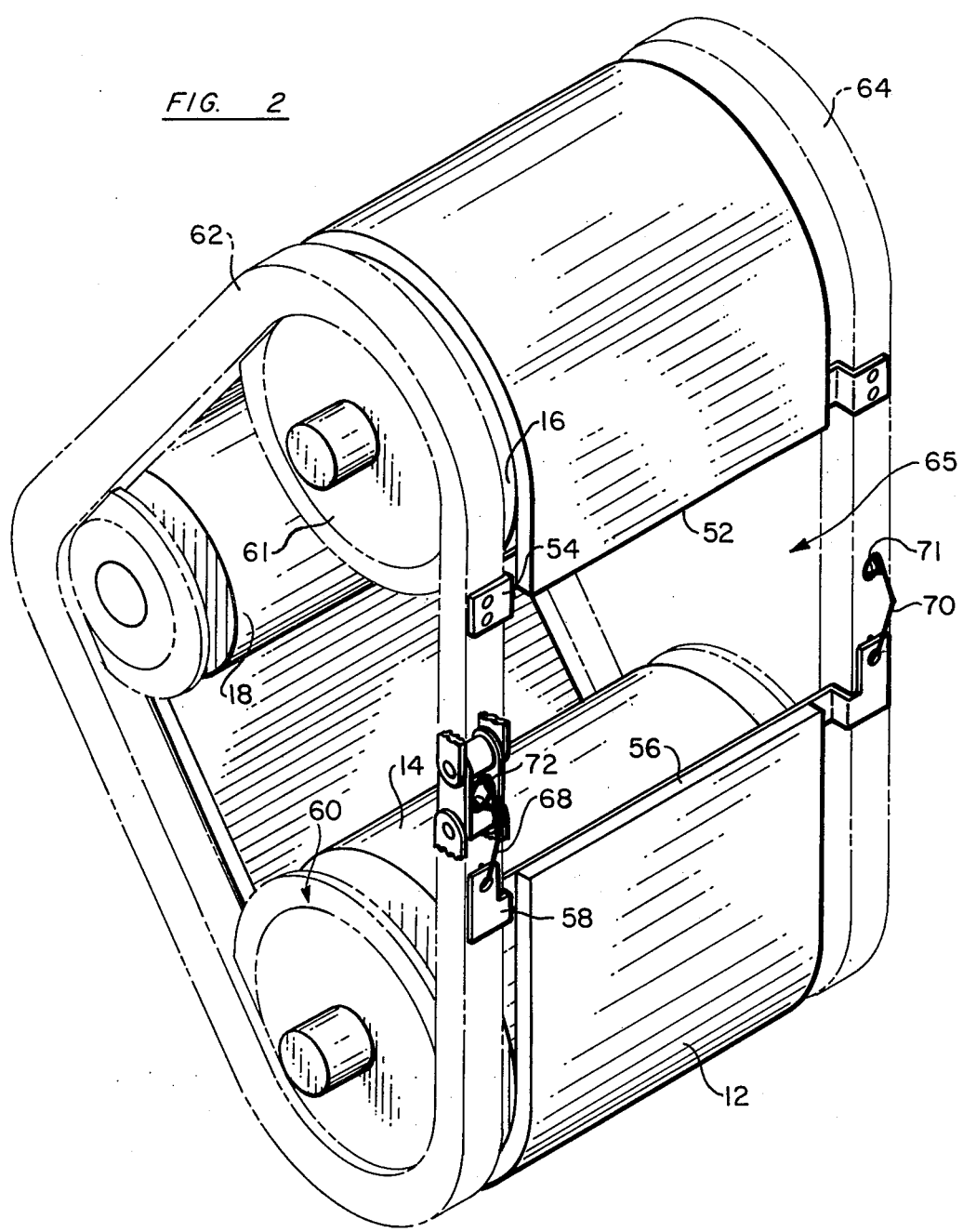
FIG. 2 is a schematic drawing of the electrostatic belt support and drive system.
Figure 3:
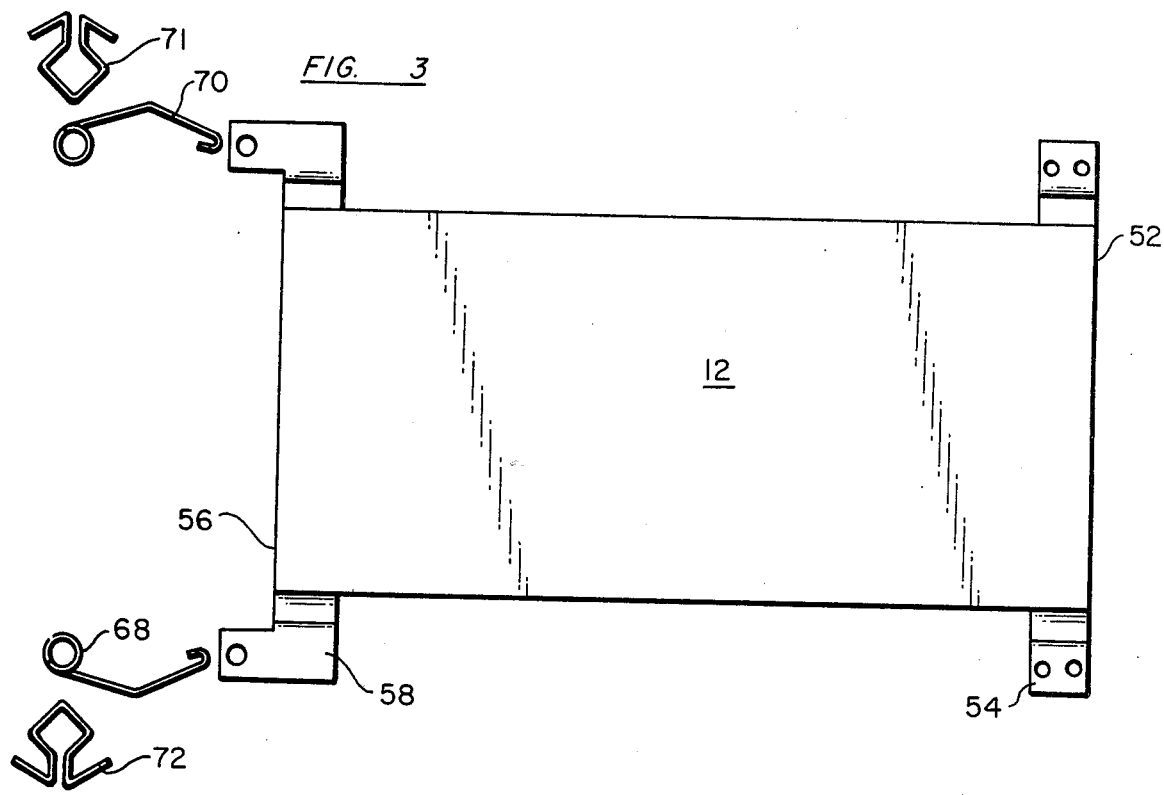
FIGS. 3 and 4 show certain details of a preferred embodiment of the electrostatic belt.
Figure 4:
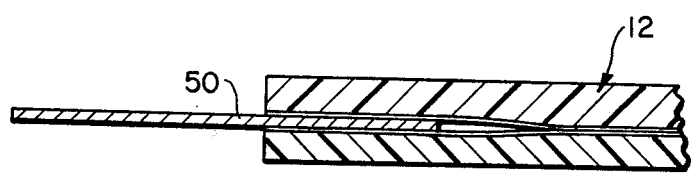

Turning next to FIGS. 2, 3 and 4, a suitable dielectric belt and its support drive mechanism is disclosed. The belt itself as seen in FIG. 4 is a generally rectangular member formed of a flexible plastic such as Mylar, one side of which has been metallized to form an electric ground plane. If desired and as best seen in FIG. 4, two layers of a suitable metallized plastic can be affixed together with their metallized sides in juxtapostion, the leading edge of the composite belt being provided with an aluminum foil connector 50 which connector is used to make the ground plane contract and to ensure that stresses which may separate the conductive coating do not impair the ground plane. With the electrostatic belt sandwich so formed, the leading edge 52 is suitably affixed to a bar or other suitable means 54 and the trailing edge 56 is suitably affixed to a trailing edge bar 58 (or other suitable means). The bars 54, 58 serve to mount and position the belt on the support apparatus of FIG. 3 wherein it is seen that the rolls 14 and 16 are provided with sprockets 60 and 61 on their opposite ends as is tensioning roller 18 provided with suitable sprockets on its opposite ends, the axles of the rollers and sprockets being supported in any conventional manner with chains 62 and 64 positioned on and engaging the sprockets. Leading edge bar 54 is bolted or otherwise affixed to the chains so that leading edge bar 54 forms the principal drive for the electrostatic belt in what can be referred to as a tractor or pulling mode. The belt is thereafter wrapped around cylinders 14, 16 and 18 and the trailing edge bar 58 is affixed to the chain through tension springs 68 and 70 with spring clips 71 and 72 securing the springs 68, 70 to the chain. The belt is thereby uniformly supported for movement, the belt being pulled by the leading edge engagement with the chains and being held in tension by the springs 68 and 70. All or a portion of the illustrated sprockets may be driven by suitable means (not shown) and the cylinders 14, 16 and 18 may be secured to the sprocket axles or may be supported for rotation on the sprocket axles as desired.

As best seen in FIGS. 1 and 2, the length of the dielectric belt is somewhat less than the total perimeter of the drive system so as to leave a discontinuity or void in the region between the leading and trailing edge bars which discontinuity is generally shown at 65. It is the purpose of this discontinutiy (as best seen in FIGS. 1 and 2) to provide for cleaning of the pin array 22 of pin tube 10 with a suitable cleaning assembly generally designated 66, which assembly is disposed opposite the pin tube 10 and permitted to periodically contact the pin face, once each complete rotation of the belt. The details of cleaning assembly 66 are not essential to this invention but may typically comprise a pivoted cleaning brush 68 which normally contacts a solvent roller 69, the brush 68 being pivoted into contact with the tube face by any suitable drive mechanism. Such additional cleaning of the nib array 22 removes any stray toner particles or other foreign material which escaped the other cleaners and wipers which would otherwise interfere with the proper electrostatic charge distribution.

Figure 5:
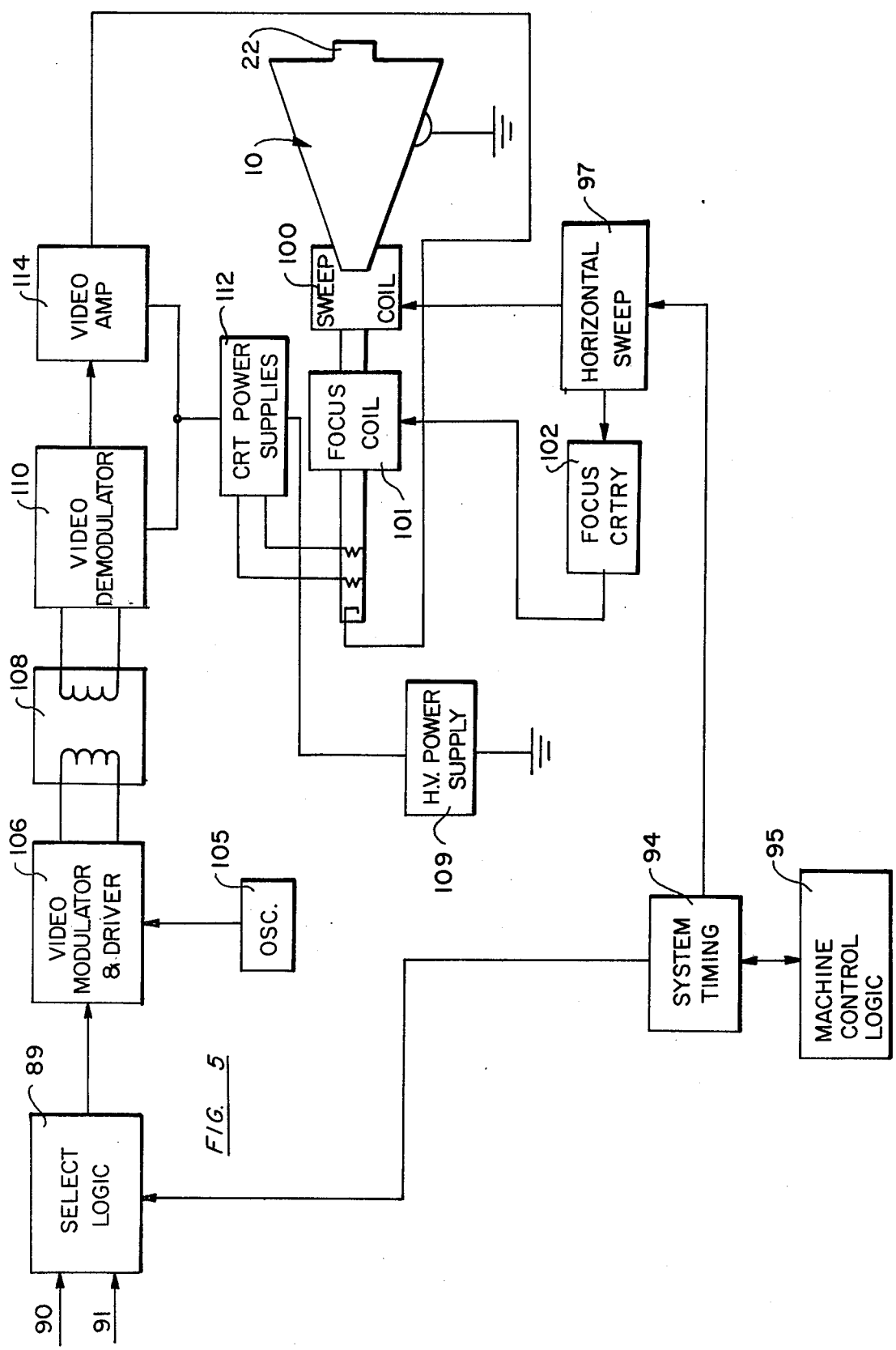
FIG. 5 is a block diagram of the control system for the cathode ray pin tube and the associated apparatus.

Turning next to FIG. 5, there is shown a block diagram schematic of the basic electronic control circuit used for the apparatus of this invention. Starting with the select logic 89, it is seen that the input to the apparatus of this invention can be a facsimile input 90 or other data or character printing input 91, the select logic being partially controlled by the system timing circuit 94 which, in turn, receives input from the machine control logic 95 which provides mechanical control of the machine. System timing logic 94 also provides an output to synchronize the sweep on the CRT pin tube 10 with the data input and the machine mechanical parameters and for that reason outputs are provided from system timing module 94 to both the select logic 89 and the horizontal sweep generator 97. Because CRT pin tube 10 is a single line sweep device, there is provided only a sweep coil 100 and a focus coil 101, the sweep coil being driven from the horizontal sweep circuit 97 which circuit also provides an input for the focus circuitry 102 whose output controls the focus coil. The output of select logic 89 feeds video modulator and driver 106 under control of a suitable oscillator 105, the output of 106 being fed through isolation transformer 108 to the input of the video demodulator 110. The high voltage power supply 109 provides a high negative voltage of the general magnitude of −20 KV and thus the isolation transformer 108 serves to separate the input circuitry from such a high negative voltage. A conventional cathode ray tube power supply 112 supplies necessary CRT voltages so that, the output of the video demodulator 110 is amplified by the video amplifier 114 to produce control of the CRT beam, the CRT beam being turned on when it is desired not to present information to the electrostatic member 12. Thus, the electrostatic member retains the positive electrostatic precharge in the areas where information is to be displayed.

In operation, electrostatic belt 12 is driven by suitable means at an appropriate speed, which speed is synchronized with the sweep frequency and the data input. Because it is desired that nib array 22 be held at or near ground potential, the tube is driven with a high negative voltage. Information is transferred to electrostatic belt 12 by selectively energizing individual conductors in the nib array 22 at specific locations across the face of the tube in accordance with the sweep frequency and the input data logic so that only those nibs positioned at a location where information is not to be presented are energized thereby to effect an electrostatic charge transfer so as to discharge the unused portions of belt 12. The continuously moving chain drive for the belt carries the belt having a latent electrostatic image formed thereon through a liquid toner bath 23 (the sprockets being spaced from the roller so as to be outside of the bath) to effect development of the image, which image is thereafter fixed on the paper.

The belt of this system and its transport and support members provide a discontinuity so that the belt 12 is not an endless loop thereby to provide a "window" 65 through which cleaning apparatus 66 can be brought to bear on the nib array 22 of the tube 10.

It is therefore seen that the present invention uniquely combines a cathode ray pin tube (CRT pin tube) with a uniformly precharged dielectric belt that is selectively discharged by selectively energized pins or conductors in the CRT nib array to form a positive electrostatically charged latent image on the belt for subsequent development and printing or other use. The system provides for periodic cleaning of the pin tube face to insure consistently high quality image formation at high operational speeds.

As will be apparent to persons skilled in the art, various modifications, adaptations and variations of the foregoing specific disclosure can be made without departing from the teachings of the present invention.

We claim:

1. Non-impact plain paper printing apparatus comprising a flexible dielectric belt, a CRT pin tube supported with the pin array in virtual contact with said dielectric belt with the major axis of the pin array disposed substantially perpendicular to the major axis of the belt, means for moving said dielectric belt relative to the pin array in a direction generally perpendicular to the major axis of the pin array, means for establishing a positive charge on said dielectric member before said member is in virtual contact with said pin array, control means for said CRT pin tube whereby the electron beam of said tube impinges only upon those pins of the pin array where information is not to be presented for subsequent display thereby to selectively remove a portion of the positive charge on said dielectric member while permitting the dielectric member to remain positively charged where information is to be presented, said control means including further means for synchronizing the impingement of the portion of the electron beam upon selected pins to the speed of said dielectric member movement, means for cleaning the pin array of said CRT pin tube supported opposite the tube with the dielectric belt disposed therebetween, said dielectric belt being discontinuous along its major axis whereby the cleaning means contacts the pin array each time the discontinuity in said dielectric member passes the pin array, and means for developing, transferring and fixing said image on paper.

2. The apparatus of claim 1 wherein said dielectric member comprises a pair of plastic sheets each with a single metalized surface affixed together with the metalized surfaces in juxtaposition, said metalized surfaces being electrically grounded.

3. The apparatus of claim 10 wherein a conductive metal foil is disposed between the leading edge of said plastic sheets, said foil being electrically grounded.

4. The apparatus of claim 9 wherein said dielectric belt is supported by a plurality of spaced rotatable members and driven by chains supported by driven sprockets, the leading edge of said belt being secured to a first member which in turn is secured to the chains at its opposite ends, the trailing edge being secured to a second member which, in turn, is resiliently secured to the chain at its opposite ends.

5. Image formation and development apparatus comprising
   (a) a discontinuous flexible dielectric member;
   (b) a CRT pin tube supported with the pin array in virtual contact with said dielectric member;
   (c) means for moving said dielectric member relative to the pin array of said CRT pin tube;
   (d) control means for said CRT pin tube whereby the electron beam of said tube impinges only upon selected pins of the pin array thereby to selectively alter the electrostatic charge on said dielectric member;
   (e) means for applying a developer to the dielectric member following said alteration of the electrostatic charge on said dielectric member by said pin tube thereby to form a developed image on the dielectric member; and
   (f) means for cleaning the pin array of the CRT pin tube supported generally opposite the tube and operative to clean the pin array when the discontinuity in the flexible dielectric member passes the pin array.

6. The image formation and development apparatus of claim 5 wherein said means for cleaning is engageable with the pin tube array.

* * * * *

UNITED STATES PATENT AND TRADEMARK OFFICE
CERTIFICATE OF CORRECTION

PATENT NO. : 4,264,912
DATED : April 28, 1981
INVENTOR(S) : Richard J. Coburn and Thomas D. Kegelman It is certified that error appears in the above—identified patent and that said Letters Patent is hereby corrected as shown below:

In the abstract, line 8, "thereafter to transferred" should be --thereafter be transferred--.

Column 4, Line 28, wherein the word "atlernatively" should be --alternatively--.

Column 4, line 42, wherein the word "contract" should be --contact--.

Column 6, line 66, wherein the words "claim 10" should be --claim 2--.

Columen 7, line 1, wherein the words "claim 9" should be --claim 1--.

Signed and Sealed this

Eighth Day of December 1981

[SEAL]

Attest:

Attesting Officer

GERALD J. MOSSINGHOFF
*Commissioner of Patents and Trademarks*